Figure 1:
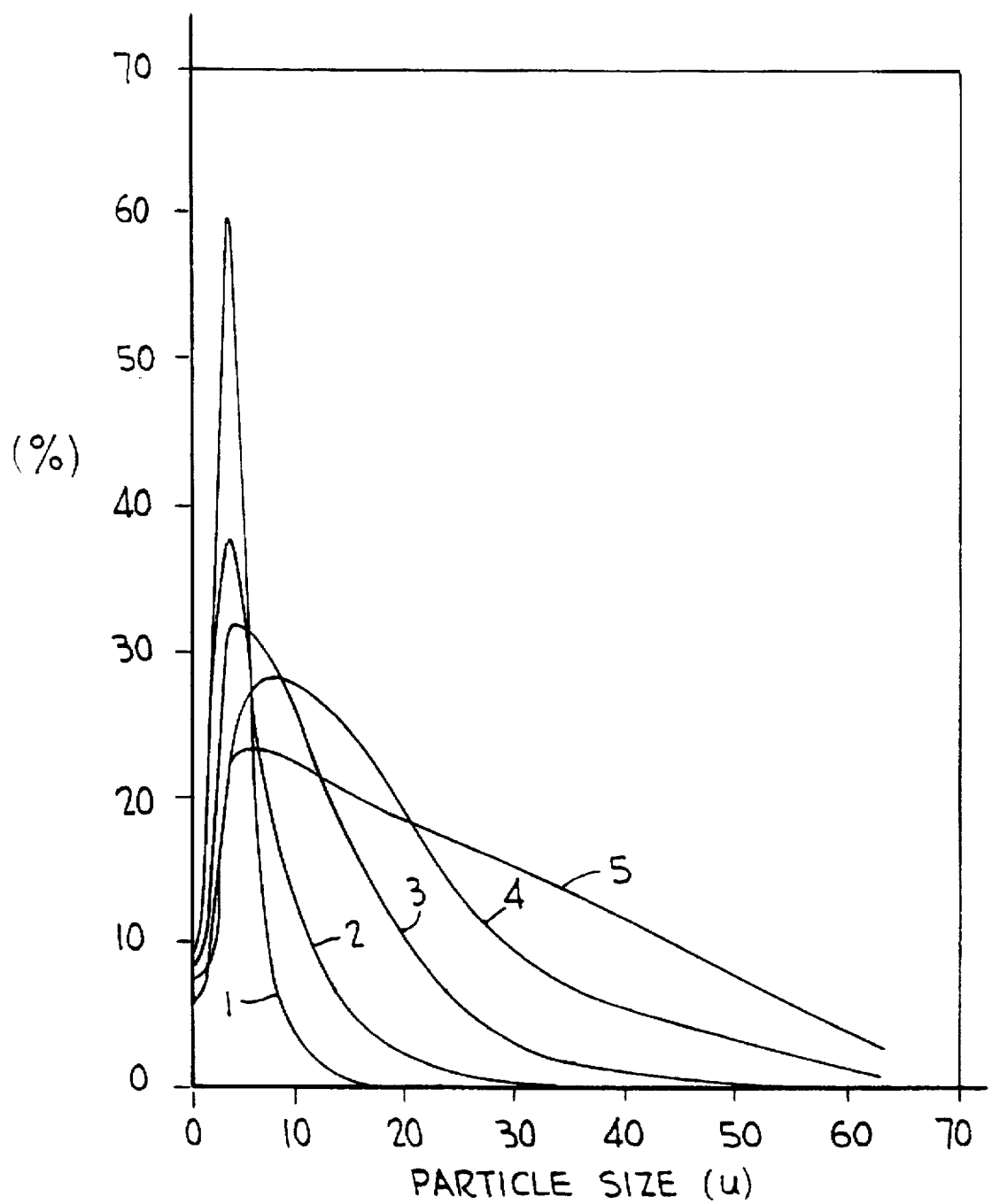

United States Patent [19]

Crews et al.

[11] Patent Number: 5,795,507
[45] Date of Patent: Aug. 18, 1998

[54] PREPARATION OF PIGMENTED MELAMINE-FORMALDEHYDE POLYMER BEADS

[75] Inventors: George M. Crews, Gonzales; Ji Shen, Donaldsonville, both of La.

[73] Assignee: Melamine Chemicals, Inc., Donaldsonville, La.

[21] Appl. No.: 669,623

[22] Filed: Jun. 24, 1996

[51] Int. Cl.$^6$ .................................. C08G 12/32
[52] U.S. Cl. .................. 264/5; 528/232; 528/256
[58] Field of Search .................. 264/5; 528/232, 528/256

[56] References Cited

U.S. PATENT DOCUMENTS

| | | | |
|---|---|---|---|
| 3,793,074 | 2/1974 | Frankenthal et al. | 117/235 |
| 3,928,272 | 12/1975 | Brancato et al. | 162/166 |
| 3,945,980 | 3/1976 | Tsubakimoto et al. | 528/258 |
| 3,982,272 | 9/1976 | Verhoeven et al. | 358/4 |
| 3,993,831 | 11/1976 | Vassiliades | 428/307 |
| 4,010,242 | 3/1977 | Iler et al. | 423/335 |
| 4,069,176 | 1/1978 | Tsubakimoto et al. | 523/333 |
| 4,148,741 | 4/1979 | Bayley | 252/62.1 |
| 4,157,983 | 6/1979 | Golden | 252/316 |
| 4,200,730 | 4/1980 | Golden | 525/398 |
| 4,239,646 | 12/1980 | Vincent et al. | 252/316 |
| 4,264,724 | 4/1981 | Moisar et al. | 430/567 |
| 4,418,942 | 12/1983 | Hosoi et al. | 427/150 |
| 4,461,848 | 7/1984 | Lawson et al. | 521/64 |
| 4,474,911 | 10/1984 | Smith et al. | 523/220 |
| 4,898,696 | 2/1990 | Sliwka | 264/4.7 |
| 5,003,034 | 3/1991 | Jarzombek et al. | 528/272 |
| 5,190,983 | 3/1993 | Bito et al. | 521/56 |
| 5,411,802 | 5/1995 | Kumar et al. | 428/402 |

*Primary Examiner*—Jeffrey C. Mullis
*Attorney, Agent, or Firm*—Breiner & Breiner

[57] ABSTRACT

Spherical porous polymer pigment beads of melamine formaldehyde resin with uniform diameter were prepared by a water-in-oil emulsion polymerization of colored methylolmelamine aqueous solution. The dyes combined with methylolmelamine to give an excellent hue stability. The pigmented melamine formaldehyde beads (PMFB) with mean size of 3-6 micron as an organic pigment showed excellent weather and heat stability, chemical resistant properties and disperability in an application medium.

10 Claims, 2 Drawing Sheets

PREPARATION OF PIGMENTED MELAMINE-FORMALDEHYDE POLYMER BEADS

FIELD OF INVENTION

This invention relates to organic pigments based on organic polymers for use in coatings, inks and paint applications. More particularly, the invention relates to spherical porous pigment beads of melamine-formaldehyde resins with uniform diameters prepared by water-in-oil emulsion polymerization of colored methylolmelamine aqueous solutions.

BACKGROUND OF INVENTION

Organic pigments in general show higher tinctorial strength and brightness than inorganic pigments. However, their opacity, thermal and chemical stability are generally lower. A number of organic pigments including polymers of styrene, acrylic acid, acrylic esters and select amino resin particles for use in coatings, inks and painting applications have been described. Thus, U.S. Pat. No. 4,148,741 discloses a method of toner formation utilizing bead polymerization to produce colored particles. The polymers are primarily based on styrene polymers or modified styrene polymers. U.S. Pat. No. 4,461,848 discloses polymer beads useful in the production of semi-gloss or satin finish paints. The polymer beads are based on crosslinked polyester resins and a pigment, for example, a titanium dioxide pigment. U.S. Pat. No. 4,474,911 discloses aqueous satin paints utilizing pigmented beads of polymers. The polymers are primarily based on an aqueous emulsion of a soluble core polymer containing carboxylic groups such as acrylic or methacrylic acid.

There are also disclosures of microspheres or beads based on aldehyde resins. For example, U.S. Pat. No. 3,928,272 discloses the preparation of spherical microspheres of urea formaldehyde which are regular in shape, useful as fillers in coating vehicles, paper coating compositions or the like. U.S. Pat. No. 4,264,724 discloses polymeric micro particles useful for forming agglomerated opacifying agents based on an aqueous solution of a polymer such as a urea-formaldehyde condensation product. U.S. Pat. No. 5,190,983 discloses hollow particles of crosslinked melamine resin having uniform particle diameter, also useful as an organic filler. No polymeric pigments based on melamine formaldehyde have been disclosed.

SUMMARY OF THE INVENTION

The present invention is directed to spherical porous polymer pigment beads of melamine-formaldehyde resins with uniform diameter. These pigmented beads are prepared by water-in-oil emulsion polymerization of colored methylolmelamine aqueous solutions. Dyes, when combined with methylolmelamine, provide excellent hue stability. Moreover, the beads with a mean particle size of from 3 to 6 microns, as an organic pigment, exhibit excellent weather and heat stability, good chemical resistant properties and good dispersibility in the application medium. The pigmented melamine-formaldehyde polymer beads (PMFB) of this invention have enhanced opacity due to the light scattering properties of the hollow spheres.

The PMFB with a uniform particle size of 3–6 microns are prepared in a water-in-oil (w/o) emulsion polymerization system in which an aqueous melamine-formaldehyde mixture is reacted and then the methylolmelamine which is formed is dispersed in a non-polar solvent such as heptane, toluene or petroleum ether in the presence of emulsifying agents. The solvents can be recovered and reused. A wide variety of particle sizes are obtained, with the particle size controlled by type and amount of emulsifying agents used in the polymerization system. The PMFB with different colors are prepared by the addition of different dyestuffs to the methylolmelamine solution. These polymeric pigments, being based on crosslinked melamine formaldehyde resins, provide excellent heat resistant, acid-basic resistant and organic solvent resistant properties. In addition, the PMFB of this invention have a hollow sphere structure due to select solvents being dissolved in the methylolmelamine during the polymerization. When the solvents evaporate, a porous or hollow spherical structure is provided having excellent opacifying properties. The polymer beads of the invention can be heated to 250° C. without melting or sticking. Also, when exposed to organic solvents such a chloroform, toluene, DMF, sodium hydroxide (0.5N) and hydrochloric acid (0.5N) for 1 hour, no fading or bleeding of the color occurs. Because the PMFB contain functional groups such as amino group (—NH$_2$), hydroxyl group (—OH),and oxygen bridges (—CH$_2$OCH$_2$—), it is very easy to obtain a variety of colors with a variety of dyes which are dispersed in the application medium.

THE DRAWING

Figure 2:
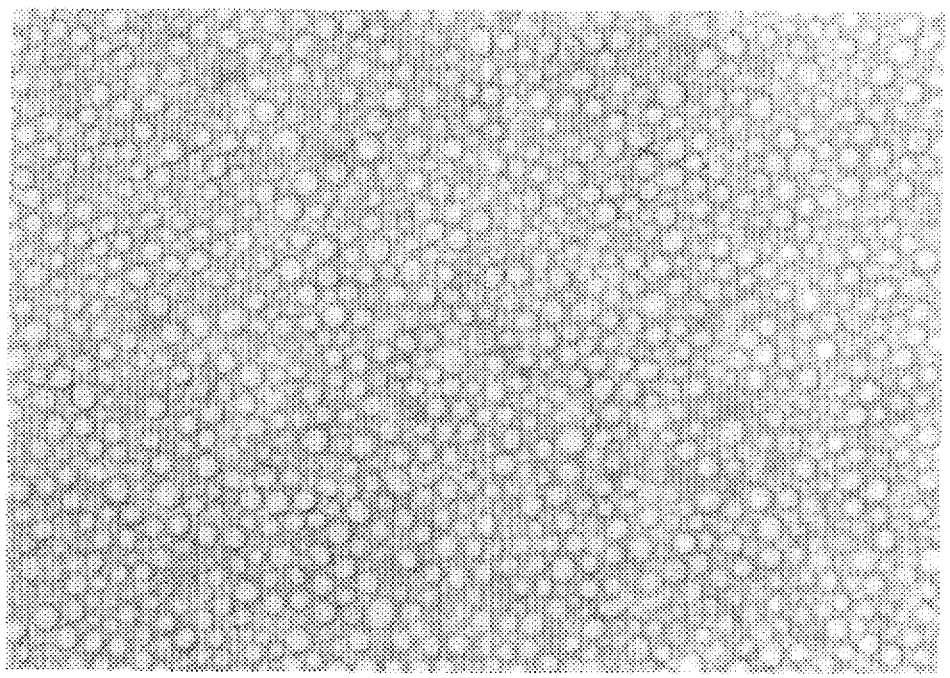
Figure 3:
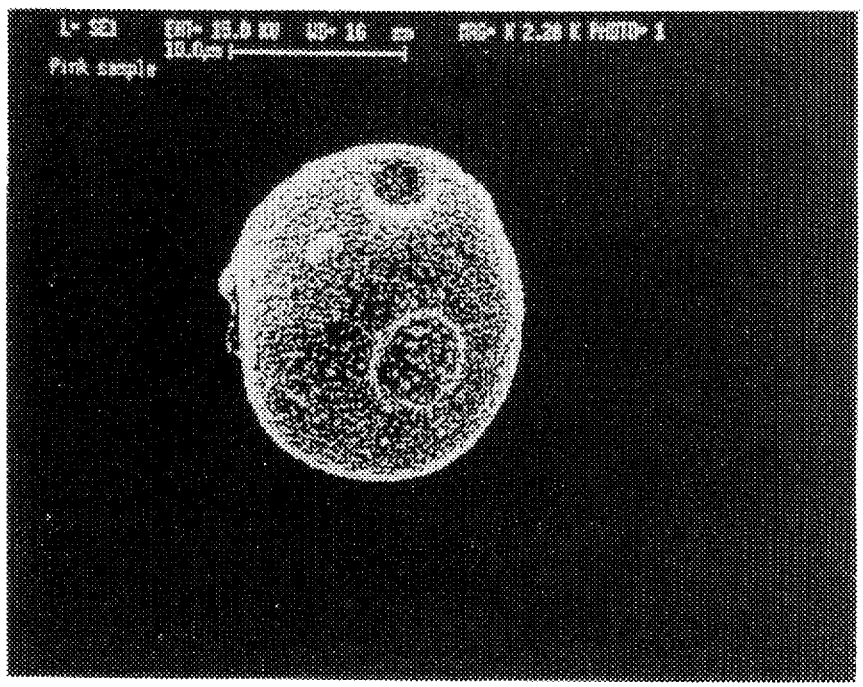

In the drawing, FIG. 1 illustrates the effect of surfactant blends on the particle size distribution of the PMFB; FIG. 2 is a micrograph showing the structure of the PMFB, and FIG. 3 is an electron micrograph showing the structure of the PMFB.

GENERAL DESCRIPTION OF THE INVENTION

Preparation of colored methylolmelamine aqueous solution.

During the methylolation step of melamine with formaldehyde, melamine and methylolmelamine, including 1–6 methylolation intermediates of melamine, have functional groups such as —NH$_2$, —NHCH$_2$OH, —N(CH$_2$OH)$_2$, as shown below:

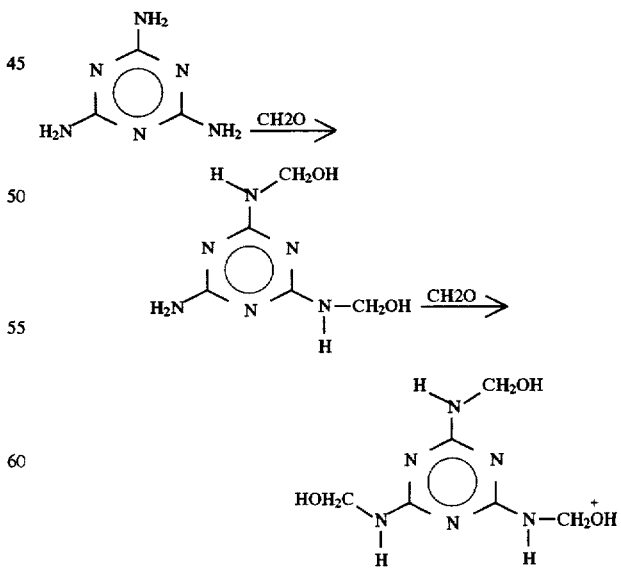

Many commercial available dyes can be selected having functional groups reactive with the functional groups on the polymer as coloring agent in the preparation of PMFB. Thus, these dyes primarily contain functional groups such as —$NH_2$, —OH, COONa, $SO_3Na$, >C=O and quaternary ions which combine easily with the functional groups on the methylolation derivatives of melamine to form various colored methylolmelamines by chemical bonds such as covalent bonds, hydrogen bonds or complex bonds. The colored methylolmelamine solutions are then polymerized to form hard insoluble beads, thus, preventing hue bleeding, fading and heat decomposition.

Many different dyes, including fluorescent dyes, direct dyes and dispersion dyes can be used as coloring agents in the preparation of PMFB with various color. In addition, a change of original color of the dye due to different pH and different combination styles between dye and PMFB and the effect of dye on dispersion of the emulsion system are possible. Examples of the dyestuffs used and hues of the PMFB are summarized in Table 1.

TABLE 1

The hue of PMFB and Dyestuffs

| Pigment | Dyestuff | Hue of PMFB | Mean size of PMFB (μ) |
|---|---|---|---|
| PMFB-DR$_1$ | Direct red 81 | Rose | 4.5 |
| PMFB-DB$_1$ | Chicagosky blue 6B | Indigo | 5.0 |
| PMFB-FY$_2$ | Fluorescent sodium salt | Orange | 4.2 |
| PMFB-FR$_2$ | Rhodamine 6G | Salmon | 3.9 |
| PMFB-DPB$_1$ | Dispersion blue 1 | Pale Blue | 4.8 |

TABLE 1-continued

The hue of PMFB and Dyestuffs

| Pigment | Dyestuff | Hue of PMFB | Mean size of PMFB (μ) |
|---|---|---|---|
| PMFB-mix (FB + FR)$_1$ | Rodamine blue + Phodamine 6G | Purple | 3.2 |
| PMFB-FW$_1$ | Fluorescent brightener 28 | Brightening white | 4.2 |

*In all cases: melamine/formaldehyde = 1:2 (mol/mol); Surfactant: Tween 85/Span 40 = 6:4; Concentration of dye = 2000 ppm (based on melamine w/w).

The effects of surfactants on PMFB.

The PMFB are prepared in an emulsion polymerization system to give a uniform diameter particle size and size distribution. The surfactants used are selected to provide a stable dispersion polymerization system. Commercial surfactant which can be used in the dispersion polymerization system to form stable water-in-oil (w/o) emulsion polymerization systems include non-ionic surfactants. According to the HLB (Hydrophile-Lipophile Balance) method of selecting surf actants, a suitable value of HLB for a stable w/o emulsion system is preferably in the 4–6 range. However, surprisingly, it has been found that an optimum range of HLB in preparation of the PMFB of this invention is between 8.5–9.3. Typically, a system of Tween 85 and Span 40 with a weight ratio of 60/40 (HLB=9.28) (curve 1 of FIG. 1) or a system of Tween 85 and Span 40 (weight ratio 50/50, HLB=8.85 (curve 2 of FIG. 1) is selected as an emulsifying agent system to give uniform, spherical particles with narrow size distribution. While surfactant system of Tween 85 and Span 40 (weight ration 40/60, HLB=7.22) (curve 3 of FIG. 1) and Tween 85 with Span 20 (1/1, HLB=9.8) (curve 4 of FIG. 1) can be used, they resulted in a larger particle size and a broader distribution range. In cases of emulsifying agents with HLB=4 (Tween 95:Span 85=24/76) and HLB>11 (Tween 40:Span 40=1/1) (curve 5 of FIG. 1), the polymeric materials lump together in an unstable emulsion system. The results are summarized in Table 2.

TABLE 2

Effect of emulsifying agent on particle size and distribution of PMFB*

| Emulsifying agent | HLB | Mean size (μ) | Particles Distribution (%) | | | | | | | |
|---|---|---|---|---|---|---|---|---|---|---|
| | | | 125 | 63 | 31 | 16 | 8 | 4 | 2 | <2 |
| T85/S85 = 1:3.16 | 4.0 | | | | | Lump together | | | | |
| T85/S85 = 1:1 | 6.40 | | | | | Agglomerates | | | | |
| T85/S40 = 4:6 | 7.22 | 7.0 | 0 | 0.1 | 2.3 | 15.5 | 29.4 | 31.4 | 13.7 | 7.7 |
| T85/S40 = 1:1 | 8.85 | 5.3 | 0 | 0 | 0.1 | 4.3 | 18.1 | 37.9 | 24.9 | 14.7 |
| T85/S40 = 6:4 | 9.28 | 3.6 | 0 | 0 | 0 | 0.1 | 15.0 | 51.4 | 23.6 | 8.9 |
| T85/S20 = 1:1 | 9.80 | 6.2 | 0 | 0 | 1.3 | 10.7 | 26.9 | 33.5 | 16.1 | 11.1 |
| T80/S80 = 3:7 | 7.51 | | | | | Agglomerates | | | | |
| T80/S80 = 1:1** | 9.65 | 10.0 | 0 | 0.5 | 8.5 | 23.7 | 28.4 | 22.7 | 9.9 | 6.3 |
| T80/S80 = 7:3 | 11.79 | | | | | Lump together | | | | |
| T80/S40 = 1:1** | 10.85 | 13.1 | 0.3 | 2.6 | 15.0 | 19.9 | 23.2 | 22.4 | 9.0 | 7.7 |
| T40/S40 = 1:1 | 11.15 | | | | | Lump together | | | | |
| T20/S20 = 1:1 | 12.65 | | | | | Lump together | | | | |
| Sodium dodicyl sulfate | 40 | | | | | Lump together | | | | |

*In all polymerization cases: Melamine/Formaldehyde = 1:2 (mol/mol); Dye direct 81 (2000 ppm based on melamine); surfactant/oil = 0.75%; oil/aqu = 3.0, water/MFR = 1.75
**The polymer beads containing some irregular particles can be observed under microscope.

It is evident from Table 2 that a suitable emulsifying agent having a proper HLB is critical to obtain good PMFB. If an emulsifying agent with an unsuitable HLB value is used in the polymerization system, it will not produce the desired spherical particles but rather will cause agglomeration or sticking of the reaction product to the reactor, giving coarse, irregular particles or even lumping.

As a possible explanation of the unusual HLB value for suitable emulsifying agents, the w/o emulsion system in PMFB preparation according to this invention can be compared to a special water phase. Thus, the colored methylolmelamine aqueous solution as the water phase in the w/o emulsion will change gradually from an hydrophile to lipophile with an increase of degree of methylolation followed by polymerization. Simultaneously, the viscosity of the polymerization system rapidly increases due to the increase in molecular weight of the melamine-formaldehyde resin. This will cause the lipophilicity of the water phase to be greater than its hydrophility. The emulsifying agents with a higher lipophilicity (low HLB value) will not keep the emulsion system in a stable state, resulting in aggregation and sticking on the reactor wall. In fact, a good w/o emulsifying phase can be clearly observed at the beginning under a microscope. When the reaction system turns turbid, the viscous solid particles are formed which easily aggregate and were found to stick to the reactor wall. In contrast, if a higher hydrophilic emulsion agent (higher HLB value) is used at the beginning of the reaction, a stable w/o emulsion system did not form, and continuous lumping resulted.

On the other hand, for formation of stable w/o emulsion system, the ratio of water-to-oil and surfactants is also important. In the preparation of PMFB, the ratio of water-to-oil phase is about 1:3 to 1:3.5 (v/v), and the concentration of emulsifying agent is in a range of 6–10% (wt. %) based on melamine resin and 0.75% based on oil phase. A lower level of surfactant will cause an aggregation of PMFB.

The preparation of PMFB.

The colored PMFB were obtained by an emulsion polymerization of melamine with formaldehyde to give hard porous spherical beads of crosslinked melamine resin which provided the pigments with excellent stability to heat, weather and chemicals. The particle shape, particle size and particle distribution depend in part on the type and concentration of emulsifiers, the ratio of water to solvents, and rate of stirring. Accordingly, all reaction conditions are to be carefully controlled for best results.

During methylolation of melamine with formaldehyde, preferably a complete methylolation of melamine and a lower rate of oligpolymerization of methylolmelamine is promoted to keep the reaction solution at a higher hydrophilicity before dispersion in the oil phase. A dyestuff is added to the water phase to form a colored methylolmelamine water phase. In the next step, an organic solvent and the selected emulsifying agents are added to the colored methylolmelamine (water phase) and stirred with an effective stirrer to provide a w/o emulsion system with the desired particle size. After the w/o emulsion is formed, the pH of the reaction system is adjusted to 5.5–8.0 to increase the polymerization rate and to form hard polymer beads. In an aging step, the polymeric beads are heated to give PMFB with a high degree of crosslinking. The chemical structure of the PMFB is:

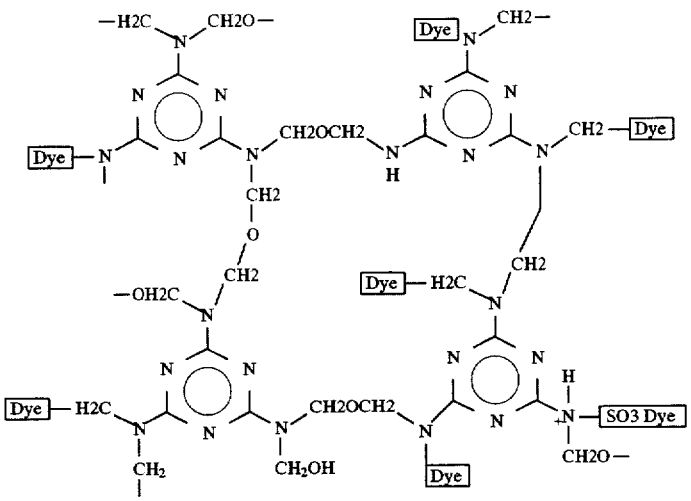

In production of PMFB, formaldehyde without methanol (50% commercial formaldehyde) preferably is employed to avoid the resulting methyl etherified melamine which may cause an emulsifying problem in the w/o emulsion system due to higher lipophilicity. If commercial 37% formaldehyde containing about 12–16% methanol is used, irregular particles may result.

The pH of the reaction system throughout the process is an important factor and is to be carefully controlled. For preparing the colored methylolmelamine solution, the pH preferably is adjusted at 9.0–9.2. At this pH, the methylolation of melamine has an optimum rate and the oligomerization rate is low. After dispersion of the colored methylolmelamine solution in the oil phase to form a w/o emulsion, the pH is adjusted gradually to about 5.5–8.0 by an addition of acid. This will increase the polymerization rate and provide a preferred pH range for the dyestuff used. Adjustment of the pH below about 5.5 results in the reaction rate being too fast and results in irregular particles. When the pH is higher than 8.0, the reaction is too slow to provide the desired particles at a reasonable cost. The curing catalysts, if used, is preferably soluble in the water phase with a significant affinity to the oil phase, such as formic acid, acetic acid, oxalic acid, methylsulfornic acid, etc.

During methylolation of melamine, the temperature of reaction is preferably held below 60°–70° C. Once the reaction mixture of melamine and formaldehyde becomes clear, it is dispersed in the oil phase and the temperature is preferably kept at about 50°–60° C. for about 30 minutes, until very small spherical droplets are obtained. The temperature is then raised to 80°–90° C. for the polymerization. If the temperature is higher in the first step, a premature polymerization may occur which is undesirable.

In the water phase, the concentration of the methylolmelamine preferably is about 25–40% by weight. If the concentration is higher than about 40%, premature polymerization can occur in the methylolation step of melamine. The mole ratio of formaldehyde to melamine can be employed in a range of about 1.0–6.0, preferably 2.0–2.5. A higher mole ratio of formaldehyde to melamine can increase the reaction rate, thereby causing irregular shaped particles and higher formaldehyde release.

Heat and chemicals resistant properties.

The pigmented melamine-formaldehyde beads (PMFB) of the present invention, being a crosslinked formaldehyde resin, have good weather stability, thermal stability, high hardness and excellent chemical stability. The decomposition temperature of PMFB is up to about 350° C. The hue of the PMFB does not change at temperatures of 200° C., even after 30 minutes exposure. Typical results of the heat resistant tests of the PMFB are summarized in Table 3.

viewed with an electron micrograph as illustrated in FIG. 3. The spherical porous structure provides good color behavior and opacification. The formation of a vesicular structure, as shown in FIG. 2, may be explained in two ways. One possibility is that water contained in the aqueous methylolmelamine droplet is not joined in the polymerization. When the polymer beads are formed in the polymerization, the water in the beads is excluded, resulting in holes or cavities to give porous beads. Another possibility is that some solvents of the oil phase, such as n-heptane, may have penetrated the surfactant layer of the w/o droplet and entered into the water phase of the methylolmelamine, which became more hydrophobic before the formation of solids. When the beads were dried, for example in a vacuum oven, the solvents evolved to give hollow and/or porous beads.

TABLE 3

Thermal stability of PMFB

| PMFB | Color | 150° C. | 200° C. | 250° C. | 300° C. | 350° C. | 400° C. |
|---|---|---|---|---|---|---|---|
| PMFB-DB$_1$ | Indigo | A(1) | A(1) | A(3) | B | D | |
| PMFB-DR$_2$ | Rose | A(1) | A(1) | A(2) | B | C | D |
| PMFB-FY$_1$ | Orange | A(1) | B(2) | B(3) | C | C | D |
| PMFB-FR$_2$ | Salmon | A(1) | A(1) | A(3) | B | D | |

Heat for a short periods: A. Hue no change B. Hue slightly change C. Hue Change D. Decompose
Heat for 60 min.: (1). No change (2). Slightly change (3). Change (4). Decompose The PMFB have excellent chemical resistant characteristic. When the PMFB are treated with a wide range of solvents such as acid, basic, acetone, chloroform, toluene and DMF, no bleeding or fading of the color of the PMFB is observed. Certain of the PMFB exhibit a slightly deeper hue than the original sample after acid treatments. This may be caused by the dye on the surface of the pigment being sensitive to acids. Typical results of the chemical resistant tests are summarized in Table 4.

The following is an example of a presently preferred embodiment in comparison to unacceptable emulsion systems.

EXAMPLE

Preparation of colored methylolmelamine solution.

Formaldehyde (50%, 12.0 g, 0.2 mol) was added to a mixture of melamine (12.6 g, 0.1 mol) and water (40 ml)

TABLE 4

Chemicals stability of PMFB

| | | Fading (Bleeding)* | | | | | |
|---|---|---|---|---|---|---|---|
| Pigments | Color | 5% HCl | 5% NaOH | Acetone | Chloroform | Toluene | DMF |
| PMFB-DB$_1$ | Indigo | A(1) | A(1) | A(1) | A(1) | A(2) | A(1) |
| PMFB-DR$_1$ | Rose | A(1) | A(1) | A(1) | A(1) | A(1) | A(1) |
| PMFB-FY$_1$ | Orange | B(1)* | A(1) | A(1) | A(1) | A(1) | A(1) |
| PMFB-FR$_2$ | Salmon | B(1)* | A(1) | A(1) | A(1) | A(1) | A(1) |

*Fading: A: None B: Slight C: Mild (4): Serious
Bleeding: (1): None (2): Slight (3): Mild (4): Serious
*The color showed a little deeper than original sample after acid treatment, but no bleeding was observed.

It is evident from Table 3 and Table 4 that the PMFB have excellent thermal resistant and chemical resistant properties. These stability and chemical resistant properties depend, in part, on reaction time during polymerization. A longer reaction time will give a higher degree of crosslinking of the PMFB which resulted in greater thermal and chemical stability.

The Shape and Structure of PMFB:

The particle shape of the PMFB prepared by emulsion polymerization of melamine and formaldehyde with dyestuff was confirmed to be spherical, porous beads when with stirring. The pH of the mixture was adjusted to 9.0–9.2 by addition of NaOH (0.5N). The mixture was heated to 70° C. and a dyestuff (Direct red 252 mg, 2000 ppm based on melamine) was added to give a colored methylolmelaminersolution. In this procedure, other dyestuffs can be used such as direct dyes, fluorescent dyes, dispersion dyes, and mixtures thereof. See Table 1.

Selection of emulsifying agents.

The emulsifying agents used in the polymerization were prepared by mixing commercial non-ionic surface active agents in different ratios to give a HLB number between 4 and 13. The following commercial surfactants were used: Tween 20, 40, 60, 80, 85; Span 20, 40, 60, 80, 85; sodium dodecyl sulfate. See Table 2.

Preparation of PMFB.

n-Heptane (200 ml) and emulsifying agent (1.0 g, Tween 85/Span 40=6/4, w/w) were added to the colored methylolmelamine solution prepared as above and stirred under a controlled stirring rate (rpm=1500–2000) for 15 minutes at 50° C. The temperature was then raised to 80°–85° C. and held for 1.5 hours. During that period of time, the pH of the reaction system was adjusted to 6.0–6.5 by an addition of formic acid (5%, 0.2 ml). The reaction mixture became turbid and gradually turned to a thick syrup due to the formation of spherical shaped particles of crosslinked melamine resin. After stirring for a additional 3 hours (aging), the reaction slurry was filtered or centrifuged to give a red cake of PMFB. The red cake was washed by water and then dried in vacuum at 100° C. to give a red powder product (weight 17.2 g, 95% yield based on melamine). The microscopic analysis established that the product was porous spherical beads with 3.9 micron mean particle diameter. Determination of particle size and particle size distribution of PMFB.

The PMFB product (0.1 g) and water (100 ml) was mixed in Ultrasound bath (mode FS5, Fisher Scientific) for 5 minutes in the presence of a small amount of dispersion agent. Particle size and its distribution were determined by a Lab-Tech 100 Particle size analyzer.

Evaluation of thermal stability of PMFB.

The decomposition temperature of PMFB were determined by Mel-Temp (Laboratory devices). Also, PMFB (5 g) were tested in small crucible and heated to 100° C., 150° C., 200° C., 250° C. and 300° C. in an oven. The color changes were observed and compared with the original PMFB. See Table 3.

Evaluation of chemical resistant properties.

PMFB (2 g) were mixed with 50 ml of chloroform, toluene, DMF, HCI (5 %) and NaOH (5 %), individually, and stirred for 30 minutes. The PMFB were filtered and compared with original PMFB for changes in bleeding and fading. See Table 4.

Determination of the structure of PMFB.

The PMFB were analyzed by electron microscope to determine the micro-structure of the spherical particles. See FIG. 3.

As will be apparent to one skilled in the art, various modifications can be made within the scope of the aforesaid description. Such modifications being within the ability of one skilled in the art form a part of the present invention and are embraced by the appended claims.

It is claimed:

1. Method of producing pigment beads of melamine formaldehyde resin comprising the steps of
   (i) forming a mixture of formaldehyde, melamine and water,
   (ii) heating said mixture of (i) and adding a dye to form a colored methylolmelamine solution,
   (iii) adding an organic solvent and emulsifying agent to said methylolmelamine solution (ii), said emulsifying agent having an HLB of 8.5–9.3, and
   (iv) heating (iii) with stirring to provide pigmented spherical shaped particles of crosslinked melamine resin.

2. The method of claim 1, wherein the surfactant concentration in step (iii) is from about 6 to 10% based on the melamine reaction product of (ii).

3. The method of claim 2, wherein the ratio of the water-to-oil phase in step (iii) is about 1:3 to 1:3.5 on a volume to volume basis.

4. The method of claim 3, wherein the particle size of the pigmented beads are from 3 to 6 microns.

5. The method of claim 4, wherein said solvent of step (iii) is a non-polar solvent selected from the group consisting of n-heptane, toluene and petroleum ether.

6. The method of claim 5, wherein the emulsifying agent of step (iii) is a non-ionic emulsifier.

7. The method of claim 6, wherein the emulsifier is a combination of Span 40 and Tween 85.

8. The method of claim 7, wherein an acid catalyst is utilized in step (iv).

9. The method of claim 8, wherein the pH of the mixture in step (iii) is adjusted to between 9.0 and 9.2 and the pH in step (iv) is adjusted to between 5.5 and 8.0.

10. The method of claim 6, wherein the emulsifier is selected from a group consisting of polyethylene oxides and sorbitol esters of a long chain fatty acid.

* * * * *